(12) United States Patent
Finley et al.

(10) Patent No.: US 12,154,271 B2
(45) Date of Patent: Nov. 26, 2024

(54) AUTOMATICALLY SEGMENTING VERTEBRAL BONES IN 3D MEDICAL IMAGES

(71) Applicant: Nuvasive, Inc., San Diego, CA (US)

(72) Inventors: Eric Finley, San Diego, CA (US); Arie Rond Shaul, San Diego, CA (US)

(73) Assignee: NuVasive, Inc., San Diego, CA (US)

( * ) Notice: Subject to any disclaimer, the term of this patent is extended or adjusted under 35 U.S.C. 154(b) by 427 days.

(21) Appl. No.: 17/761,934

(22) PCT Filed: Sep. 24, 2020

(86) PCT No.: PCT/US2020/052350
§ 371 (c)(1),
(2) Date: Mar. 18, 2022

(87) PCT Pub. No.: WO2021/061878
PCT Pub. Date: Apr. 1, 2021

(65) Prior Publication Data
US 2022/0375079 A1 Nov. 24, 2022

Related U.S. Application Data

(60) Provisional application No. 62/905,140, filed on Sep. 24, 2019.

(51) Int. Cl.
| | |
|---|---|
| *G06K 9/00* | (2022.01) |
| *G06T 7/00* | (2017.01) |
| *G06T 7/11* | (2017.01) |
| *G06T 7/149* | (2017.01) |
| *G06T 11/00* | (2006.01) |
| *G06V 10/44* | (2022.01) |
| *G06V 20/64* | (2022.01) |

(52) U.S. Cl.
CPC .............. *G06T 7/0012* (2013.01); *G06T 7/11* (2017.01); *G06T 7/149* (2017.01); *G06T 11/008* (2013.01); *G06V 10/44* (2022.01); *G06V 20/64* (2022.01); *G06T 2207/20084* (2013.01); *G06T 2207/30012* (2013.01); *G06V 2201/033* (2022.01)

(58) Field of Classification Search
CPC .. G06K 9/00; G06T 7/00; A61B 5/103; A61K 35/12
USPC ........ 382/100, 103, 106, 128–133, 154–156, 382/168, 173, 181, 199, 224, 254, 276, 382/286–291, 312; 600/327, 340, 587
See application file for complete search history.

(56) References Cited

U.S. PATENT DOCUMENTS

| | | | | |
|---|---|---|---|---|
| 8,891,848 | B2 * | 11/2014 | Blumfield | G16H 30/20 382/128 |
| 11,074,688 | B2 * | 7/2021 | Chabin | G06T 7/0012 |
| 2012/0143090 | A1 * | 6/2012 | Hay | A61B 6/505 600/587 |
| 2012/0183193 | A1 * | 7/2012 | Wels | G06V 10/774 382/131 |
| 2013/0077840 | A1 | 3/2013 | Blumfeld et al. | |

(Continued)

OTHER PUBLICATIONS

PCT International Search Report for PCT Application No. PCT/US2020/052350 mailed Jan. 15, 2021 (5 pages).

(Continued)

*Primary Examiner* — Seyed H Azarian (57) ABSTRACT

Disclosed herein are systems and methods for vertebral bone segmentation and vertebral bone enhancement in medical images.

5 Claims, 6 Drawing Sheets

(56) References Cited

U.S. PATENT DOCUMENTS

2018/0092699 A1\* 4/2018 Finley .................... A61B 34/20
2018/0286050 A1\* 10/2018 Cheng .................... G06T 7/143

OTHER PUBLICATIONS

PCT Written Opinion for PCT Application No. PCT/US2020/052350 mailed Jan. 15, 2021 (13 pages).

\* cited by examiner

Disk map

Localization map

AUTOMATICALLY SEGMENTING VERTEBRAL BONES IN 3D MEDICAL IMAGES

CROSS REFERENCE

This application is a National Stage Application of PCT/US2020/052350, filed Sep. 24, 2020, which claims priority to U.S. Provisional patent application No. 62/905,140, filed on Sep. 24, 2019, the entire contents of which are hereby expressly incorporated by reference into these disclosures as if set forth in their entirety herein.

BACKGROUND

Medical imaging modalities such as magnetic resonance imaging (MRI) scanners, computed tomography (CT) generate a large amount of image data.

SUMMARY

Because of large amount of image data generated by such medical imaging modalities, there has been and remains an urgent need for developing image processing techniques that can automate some or all of the processes to determine the presence of anatomical features and abnormalities and/or extract anatomical information of interest buried in a large amount of data.

Disclosed herein are systems and methods for automatic segmentation of vertebrae from medical images. Disclosed herein are systems and methods for automatic boosting of anatomical feature of interest, e.g., vertebral bone, in medical images. The medical images disclosed herein can be two-dimensional (2D) or three-dimensional (3D). The medical imaging modalities disclosed herein are not limited to X-ray, CT, but can be any imaging modalities such as MRI, ultrasound, etc. The segmentation methods disclosed herein can be advantageously utilized in a wide spectrum of medical image analysis or image-guided medical operations. For example, segmentation results can be used in 3D navigation of surgical instruments and 2D-3D registration of images taken pre-operatively and intra-operatively.

Disclosed herein, in one aspect, are computerized methods for segmenting vertebral bones of a subject, the method comprising: receiving, by a computer, a medical imaging dataset of the subject, wherein the medical imaging dataset is 3D and contains a plurality of vertebral bones; segmenting, by the computer, automatically the plurality of vertebral bones, comprising one or more of: extracting a spinal canal of the subject in the medical imaging dataset optionally using at least a plurality of axial images obtained from the medical imaging dataset; generating an anterior line of the vertebral bones optionally using one or more sagittal images from the medical imaging dataset; obtaining a posterior line based on the extracted spinal canal; generating a centerline using the anterior line and the posterior line; localizing vertebral bones by detecting intervertebral discs optionally using convolutional neural network or morphology information of the discs and getting a separating plane between adjacent vertebral bones from the detected intervertebral discs; finding a bound box for each of the vertebral bones; separating vertebral bones from adjacent tissues; selecting seeds for vertebral bones based on separated vertebral bones and optionally selecting seeds for adjacent tissues; segmenting the vertebral bone using one or more of: a graph-cut algorithm, a region growing algorithm, and a weighting calculated based on image intensity, image gradient, or image characteristics of vertebral bone (e.g., sheetness or likelihood of having a flat anatomical feature like disc or bone edge); and optionally adjusting imaging intensity of one or more edges, one or more regions, or both of the segmented vertebral bone.

Disclosed herein, in another aspect, are computerized methods for segmenting vertebral bones of a subject using machine learning, the method comprising: receiving, by a computer, a medical imaging dataset of the subject, wherein the medical imaging dataset is 3D and contains a plurality of vertebral bones; optionally applying smoothing to the medical imaging dataset; optionally down-sampling the medical image dataset thereby generating a down-sampled dataset; separating the down-sampled dataset into a plurality of patches; segmenting, by the computer, automatically each of the plurality of patches using a neural network algorithm, wherein the neural network is optionally a deep neural network, and wherein the neural network is optionally trained with labeled data; combining the plurality of patches for restoration of the medical imaging dataset and up-sampling the combined patches thereby generating restored dataset; generating boundary patches from the restored dataset; segmenting automatically the boundary patches using a refined neural network algorithm that includes a finer-resolution, more precise step done after a coarser, initial step, wherein the refined neural network algorithm is refined based on the neural network algorithm, the segmented plurality of patches, or both; combining the boundary patches for a finer restoration of the medical imaging dataset; and optionally adjusting imaging intensity of one or more edges, one or more regions, or both of the segmented vertebral bone.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Disclosed herein, in some case, are methods for segmenting vertebral bones of a subject, the method comprising: receiving, by a computer, a medical imaging dataset of the subject, wherein the medical imaging dataset is three-dimensional (3D) and contains a plurality of vertebral bones; segmenting, by the computer, automatically the plurality of vertebral bones, comprising one or more of: extracting a spinal canal of the subject in the medical imaging dataset using at least a plurality of axial images obtained from the medical imaging dataset; generating an anterior line of the plurality of vertebral bones using one or more sagittal images from the medical imaging dataset; obtaining a posterior line based on the extracted spinal canal; generating a centerline using the anterior line and the posterior line; localizing the plurality of vertebral bones by detecting intervertebral discs optionally using convolutional neural network or morphology information of the discs and getting a separating plane between adjacent vertebral bones from the detected intervertebral discs; finding a bound box for each of the plurality of vertebral bones; separating the plurality of vertebral bones from adjacent tissues; selecting seeds for the plurality of vertebral bones based on the separated vertebral bones and selecting seeds for adjacent tissues; segmenting one or more of the plurality of vertebral bones using one or more of: a graph-cut algorithm, a region growing algorithm, and a weighting calculated based on image intensity, image gradient, or sheetness; and adjusting imaging intensity of one or more edges, one or more regions, or both of the one or more of the plurality of vertebral bones.

Disclosed herein, in some embodiments, are methods for segmenting vertebral bones of a subject, the method comprising: segmenting, by the computer, automatically a plurality of vertebral bones in a medical imaging dataset, wherein the medical imaging dataset is three-dimensional (3D) and contains the plurality of vertebral bones, comprising one or more of: localizing the plurality of vertebral bones by getting a separating plane between adjacent vertebral bones using detected intervertebral discs; finding a bound box for each of the plurality of vertebral bones; separating the plurality of vertebral bones from adjacent tissues; selecting seeds for one or more the plurality of vertebral bones based on the separated plurality of vertebral bones; and segmenting the one or more of the plurality of vertebral bones using one or more of: a graph-cut algorithm, a region growing algorithm, and a weighting calculated based on image intensity, image gradient, or sheetness. In some embodiments, the method further comprises receiving, by the computer, the medical imaging dataset of the subject, wherein the medical imaging dataset is three-dimensional (3D) and contains a plurality of vertebral bones. In some embodiments, segmenting automatically the plurality of vertebral bones comprises one or more of: extracting a spinal canal of the subject in the medical imaging dataset optionally using at least a plurality of axial images obtained from the medical imaging dataset; generating an anterior line of the plurality of vertebral bones using one or more sagittal images from the medical imaging dataset; obtaining a posterior line based on the extracted spinal canal; and generating a centerline using the anterior line and the posterior line. In some embodiments, localizing the plurality of vertebral bones comprises detecting intervertebral discs and getting the separating plane between adjacent vertebral bones from the detected intervertebral discs. In some embodiments, detecting intervertebral discs comprises using convolutional neural network or morphology information of the intervertebral discs. In some embodiments, selecting seeds for the one or more of the plurality of vertebral bones comprises selecting seeds for adjacent tissues. In some embodiments, the method further comprises adjusting imaging intensity of one or more edges, one or more regions, or both of the one or more of the plurality of vertebral bones. In some embodiments, the method for segmenting vertebral bones of a subject using machine learning, comprises: receiving, by a computer, a medical imaging dataset of the subject, wherein the medical imaging dataset is three-dimensional (3D) and contains a plurality of vertebral bones; down-sampling the medical image dataset thereby generating a down-sampled dataset; separating the down-sampled dataset into a plurality of patches; segmenting, by the computer, automatically each of the plurality of patches using a neural network algorithm; combining the plurality of patches for restoration of the medical imaging dataset and up-sampling the combined patches thereby generating restored dataset; generating boundary patches from the restored dataset; segmenting automatically the boundary patches using a refined neural network algorithm; and combining the boundary patches for a finer restoration of the medical imaging dataset, thereby generating one or more segmented vertebral bones. In some embodiments, the method further comprises applying smoothing to the medical imaging dataset prior to down-sampling. In some embodiments, the neural network is a deep neural network. In some embodiments, the neural network is trained with labeled data. In some embodiments, the refined neural network algorithm is refined based on the neural network algorithm, the segmented plurality of patches, or both. In some embodiments, the method further comprises adjusting imaging intensity of one or more edges, one or more regions, or both of the one or more segmented vertebral bones.

Certain Terms

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

3D Datasets

In some embodiments, the systems, methods, and media disclosed herein include a 3D medical imaging dataset of a subject. The 3D medical imaging dataset can be taken with any medical imaging modalities. Non-limiting examples of the imaging modalities include CT, MRI, ultrasound, (Positron-emission tomography) PET, and (single-photon emission computerized tomography) SPECT.

In some embodiments, the 3D dataset may include one or more anatomical features of interest, e.g., a couple of adjacent vertebrae or even the whole spinal cord. In some embodiments, the 3D dataset includes a plurality of voxels in a coordinate system determined by x1, y1, and z1. The voxel size of the 3D dataset can be varied based on the anatomical structure to be imaged or the imaging modalities. The number of voxels in the x1, y1, z1 directions can also be varied based on the anatomical structure to be imaged and the imaging modalities. As an example, the 3D dataset may include 512 voxels along the x1 and z1 direction corresponding to the left to right and anterior to posterior directions of the patient, respectively, and 2056 pixels along the y1 direction corresponding to the head to foot direction. The voxels may be isotropic or non-isotropic. A length, width, or height of a voxel may be in the range of about 0.1 mm to about 1 cm. The 3D dataset may be in file format such as DICOM, so that the header of the dataset includes imaging parameters and positional parameters related to the image.

Figure 6A:
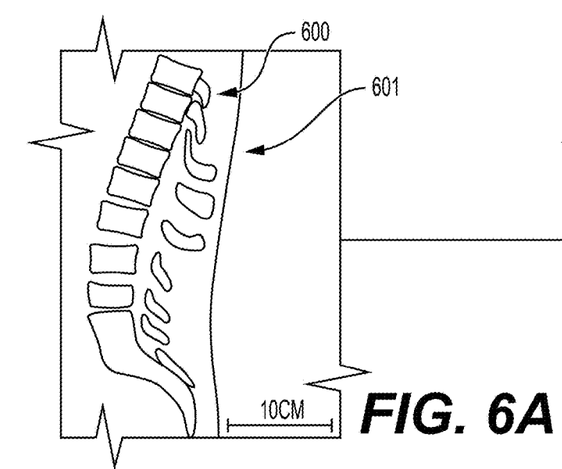
FIGS. 6A-6D shows exemplary CT images in a sagittal (6A) view and a coronal (6B) view before segmentation, and CT images superimposed with segmentation results in both views, sagittal (6C) and coronal (6D)
Figure 6B:
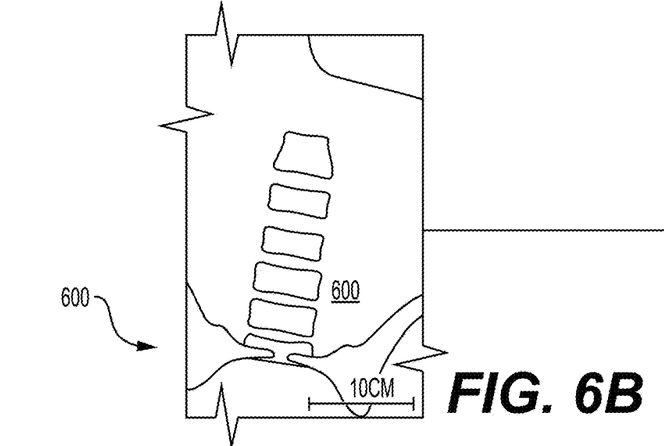

3D dataset disclosed herein can include one or more markers 601 that are attached to the anatomical features, exemplary markers can be seen in FIG. 6A. The position of the marker(s) with respect to the anatomical features remain constant so that the marker(s) can be used as a reference point to align images to the same 3D coordinate system which is the same coordinate system of the 2D images. In some embodiment, one or more marker are attached to each anatomical feature of interest.

In some embodiments, the 3D dataset herein includes original 3D registration between 3D preoperative CT scan and the infrared signal detected by the second image capturing device. In some embodiments, the 3D preoperative scan is obtained after the marker(s) is placed. The exact location and orientation of the marker inside the 3D scan are detected. Such detection may use a deep learning algorithm. In some embodiments, a deep learning algorithm is used to find clusters of voxels, each cluster may represent a marker candidate. The location and orientation of the marker can be used to calculate a transformation matrix between the infrared signal domain and the spatial domain of the 3D scan. The transformation matrix may be a 4 by 4 matrix.

Image Capturing Devices

The systems, methods, and media disclosed herein include an image capturing device. The image capturing device can be any device that is capable of capturing data that can be used to generate a medical image of the subject. The image capture device can utilize one or more imaging modalities. For example, the image capturing device can include a Radiographic imaging device and an ultrasound imaging device. As another example, the image capture device can be an imaging scanner, such as an X-ray image intensifier or a C-arm. In some embodiments, the image capturing device can include a camera. The camera may utilize visible light, infrared light, other electro-magnetic waves in the spectrum, X-ray, or other sources.

In some embodiments, the image capturing device can include a Siemens Cios Spin machine or a General Electric C-arm. In some embodiments, the image capturing device can include a flat panel device.

In some embodiments, the image capturing device is in communication with the systems, methods, and media herein for data communication, or operational control of the image capturing device.

In some embodiments, the image capturing device includes an imaging sensor for detecting signal, e.g., visible light, x-ray, radio frequency (RF) pulses for generating the image(s). In some embodiments, the image capturing device includes one or more software modules for generating images using signal detected at the imaging sensor. In some embodiments, the image capturing device include a communication module so that it communicates data to the system, the digital processing device, a digital display, or any other devices disclosed herein.

Anatomical Features

In some embodiments, the 3D dataset images include one or more anatomical features. In some embodiments, the anatomical features herein include a plurality of vertebral bone. In some embodiments, the anatomical features herein include at least a portion of the spinal cord. In some embodiments, the anatomical features include at least a vertebra of the subject.

In some embodiments, the anatomical feature can be any organ or tissue of the subject.

Segmentation

In some embodiments, the systems, methods, and media disclosed herein utilize the 3D medical imaging dataset to generate a segmented 3D dataset. The anatomical features are segmented in the segmented 3D dataset. In some embodiments, the outer contour or edges of the anatomical features are determined in the segmented 3D dataset. Segmentation and its method steps can be an important step that is required in other medical imaging or medical operation related functions, non-limiting examples of such functions include: navigation of medical instruments, registration of 2D to 3D images, bone enhancement, etc. Vertebral segmentation has several different outputs possible. According to one aspect, the output is a boolean label on each voxel in a 3D image that indicates, "bone" or "not bone," "disc" or "not disc," and "spinal canal" or "not spinal canal." According to another aspect, the output is an integer label on each voxel in a 3D image wherein each vertebral level gets its own unique label, and all voxels inside that vertebra have the same label and, likewise, disc and spinal canal may have yet another label value. According to yet another aspect, the output is anatomical sub-categories of each vertebral level that are assigned their own distinct label (e.g. 1=pedicle, 2=vertebral body, 3=spinous process, etc.). For all of these different outputs, the entire 3D volume of the object is labeled. In other words, all voxels in the interior of the vertebral level are labeled with that level's label.

In some embodiments, the methods for segmenting vertebral bones of a subject as disclosed herein uses model-based algorithms. In some embodiments, the method disclosed herein includes one or more method steps disclosed herein but not necessarily in the order that the steps or operations are disclosed herein.

Figure 1A:
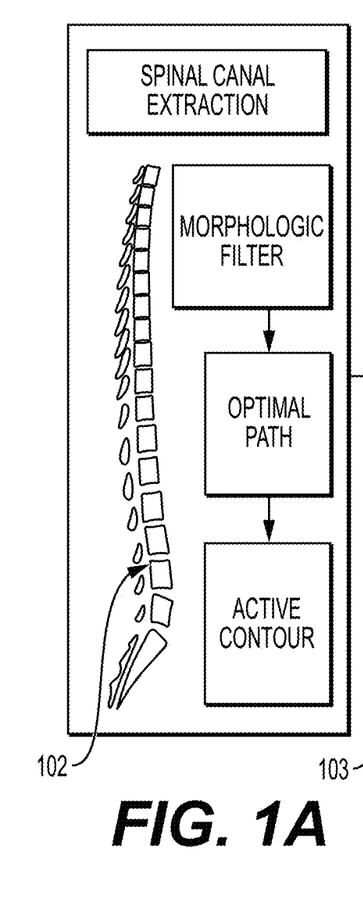
FIGS. 1A-1D show an exemplary embodiment of method steps for automatically segmenting vertebral bones of the subject from 3D medical imaging data.
Figure 1B:
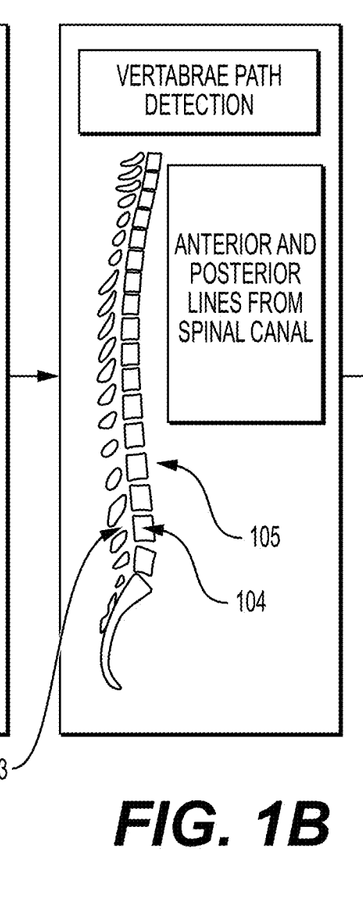
Figure 1C:
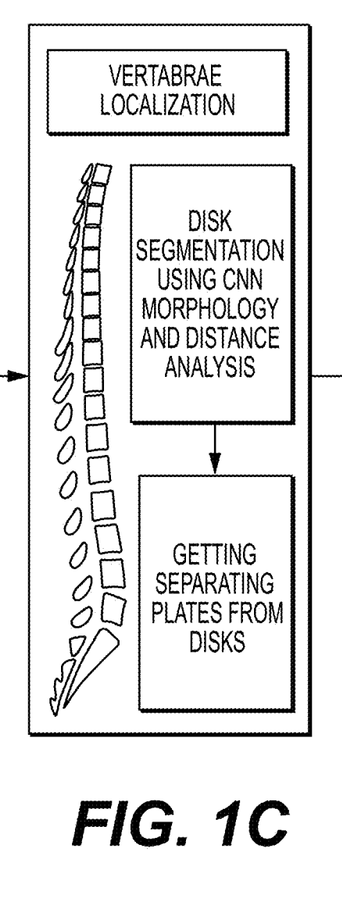
Figure 1D:
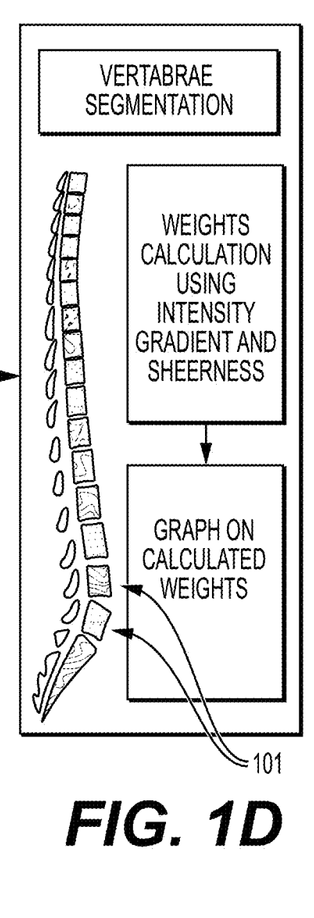

As shown in FIGS. 1A-1D, in an exemplary embodiment, segmentation of the vertebrae 101 can be automatic or semi-automatic, and can include one or more of method steps of spinal canal extraction (FIG. 1A), vertebrae path detection (FIG. 1B), vertebrae localization (FIG. 1C), and vertebrae segmentation (FIG. 1D).

Figure 2A:
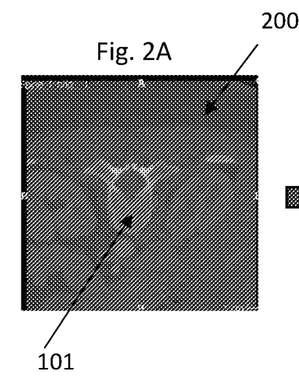
FIGS. 2A-2B show an exemplary embodiment of a spinal extraction step for automatic segmentation of vertebral bones.
Figure 2B:
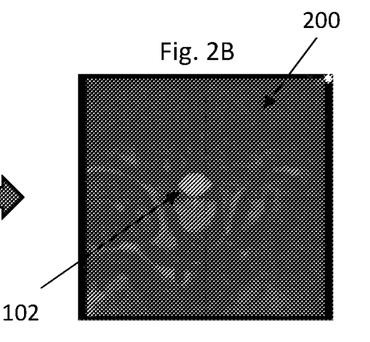

For spinal canal extraction, as shown in FIG. 2A-2B, preprocessing of the canal 102 may be performed in the axial plane, and the morphology of the canal in each axial slice 200 of the 3D volume can be reconstructed and connected to complete the canal segmentation of the 3D image dataset. Active contour can be used in this extraction process. Based on the spinal canal segmentation, the posterior line 103 and anterior lines 104, 105 of the vertebrae defined by the canal 102 can be determined, as shown in FIG. 1B. A centerline 106 of the vertebrae, e.g., the line that is about equal distance to the posterior and the anterior line of the vertebrae can also be determined, as in FIG. 3.

As in FIG. 1C, vertebrae can be localized by first detecting vertebral discs 107 using a convolutional neural network algorithm and/or morphology information of the discs. Secondly, distance analysis can be used to find missing disc(s) or false detection(s). Based on the disc surface(s) identified, the separating planes 108 between adjacent vertebrae can be determined. The separating plane may not intersect with vertebrae that are adjacent to it. It may have a thickness that is smaller than a height of a vertebral disc.

As in FIG. 1D, vertebrae 101 are separated from surrounding tissue, e.g., canal 102 and discs 107, and weighting can be added based on image intensity, intensity gradient, and image characteristics, e.g., sheetness of the 3D dataset to refine vertebrae segmentation.

In some embodiments, the segmentation is for one vertebra, more than one vertebrae, or even each vertebra of the entire spinal cord. After segmentation, single vertebra 3D datasets can be generated for each vertebra that has been segmented.

In some embodiments, the method includes receiving a medical imaging dataset of the subject for segmentation, wherein the medical imaging dataset is 3D and contains a plurality of vertebral bones.

Figure 3:
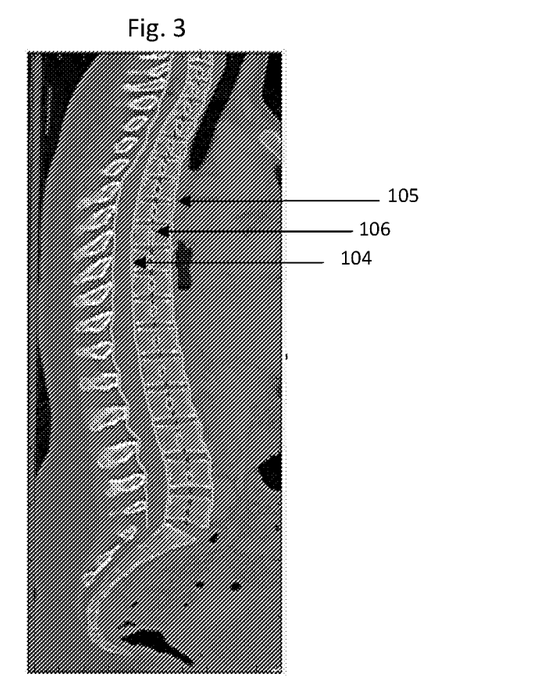
FIG. 3 shows an exemplary embodiment of an extracted spinal canal with anterior, posterior and centerline of the vertebral bones generated.

The segmentation of the plurality of vertebral bones can include one or more method steps. One step can be extracting a spinal canal of the subject in the medical imaging dataset, as shown in FIG. 1A. This step optionally uses at least a plurality of axial images 200 obtained from the 3D medical imaging dataset as shown in FIGS. 2A-2B, where the spinal canal can be unambiguously identified with its outer contour. Then each axial view can be stacked together, and an optimal path that goes through all the axial images can be found and used for canal segmentation. After the spinal canal and its contours are segmented, one other step can be generating an anterior line of the vertebral bones optionally using one or more sagittal images from the medical imaging dataset; obtaining a posterior line based on the extracted spinal canal; and generating a centerline using the anterior line and the posterior line, as shown in FIGS. 1B and 3.

Figure 4A:
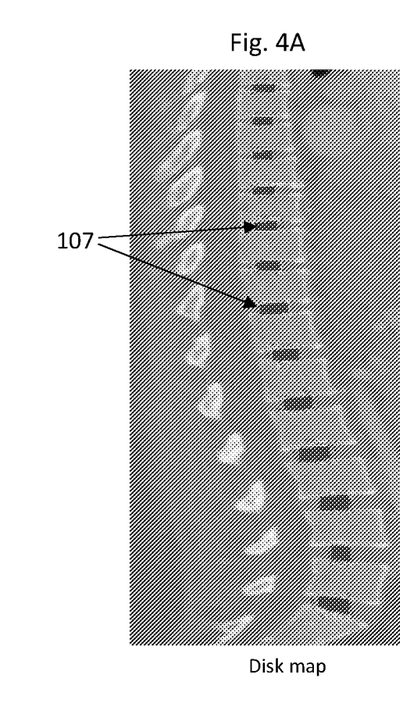
FIGS. 4A-4B show an exemplary embodiment of a method step of detecting intervertebral discs and a method step of finding a bound box for each of the vertebral bones.
Figure 4B:
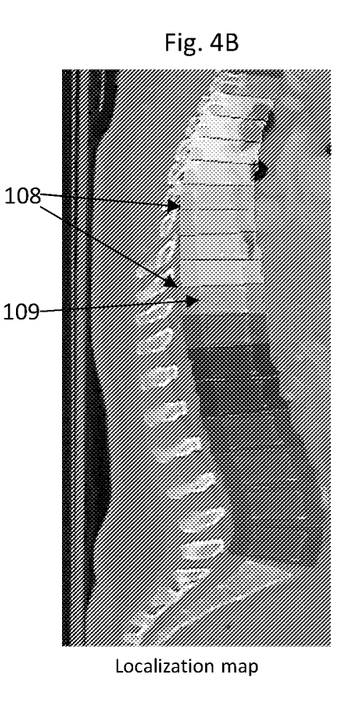

The vertebral localization step as shown in FIG. 1C can include one or more sub-steps such as detecting intervertebral discs optionally using convolutional neural network or morphology information of the discs and getting a separating plane 108 between adjacent vertebral bones 101 from the detected intervertebral discs, as shown in FIG. 4A; and finding a bound box 109 for each of the vertebral bones, as in FIG. 4B.

Figures 5A, 5B:
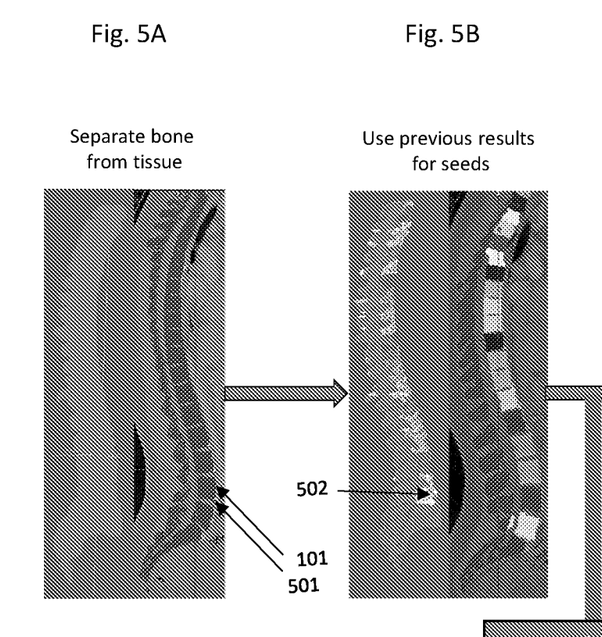
FIGS. 5A-5D show an exemplary embodiment of method steps of separating vertebral bones from adjacent tissues, selecting seeds for vertebral bones based on separated vertebral bones and optionally selecting seeds for adjacent tissues; segmenting the vertebral bone using one or more of: a graph-cut algorithm, a region growing algorithm, and a weighting calculated based on image intensity, image gradient, or sheetness.
Figure 5C:
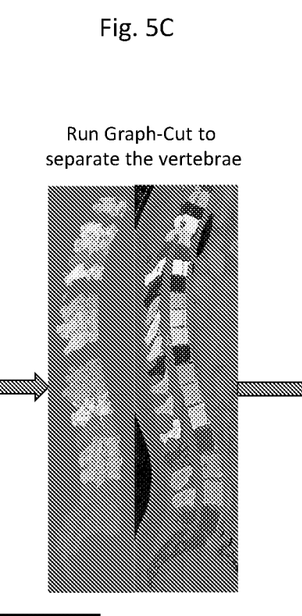
Figure 5D:
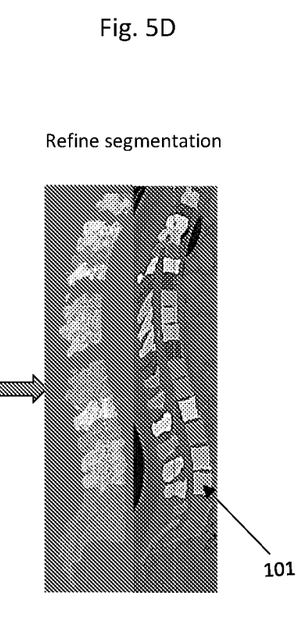

Subsequently, vertebral bone can be segmented as in FIG. 1D, and can include one or more sub-steps such as separating vertebral bones 101 from adjacent tissues 501, e.g., discs, soft tissues (FIG. 5A); and selecting seeds 502 for vertebral bones based on separated vertebral bones and optionally selecting seeds for adjacent tissues (FIG. 5B). The selection of seeds may be automatic or manual. The seeds may be automatically selected using output from the previous sub-step, e.g., separated vertebral bones as shown in FIG. 5A. The selected seeds may be used in segmentation. For example, the selected seeds can be used in a graph-cut algorithm. As another example, the selected seeds can be used in region growing algorithm. Segmenting the vertebral bone can use one or more of: a graph-cut algorithm, a region growing algorithm, and a weighting calculated based on image intensity, image gradient, or image characteristics, such as voxel sheetness (FIG. 5C); and optionally refine segmentation as shown in FIG. 5D.

After segmentation, imaging intensity of one or more edges, one or more regions, or both of the segmented vertebral bone can be adjusted either manually by a user or automatically by the methods disclosed herein to provide enhanced visualization of vertebral bones of interest.

In some embodiments, one or more sub-steps in segmentation may implement a deep learning algorithm. For example, the 3D scan may be split into patches and a neural network may be used to segment each patch.

The methods utilizing deep learning or deep neural network algorithms can include after receiving a medical imaging dataset of the subject optionally applying smoothing to the medical imaging dataset, optionally down-sampling the medical image dataset thereby generating a down-sampled dataset. The down-sampled dataset can be separated into a plurality of patches. Each patch may be 3D, and may contain part of a vertebral, at least a full vertebral, or more than one vertebral therein. Then, each of the plurality of patches can be segmented using a neural network algorithm, wherein the neural network is optionally a deep neural network, and wherein the neural network is optionally trained with labeled data. Each segmented patch can then be combined for restoration of the medical imaging dataset, and the combined patches are then up-sampled thereby generating a restored dataset with coarse segmentation. The methods can then include generating boundary patches from the restored dataset and segmenting automatically the boundary patches using a refined neural network algorithm. The refined neural network algorithm can be refined based on the neural network algorithm, the segmented plurality of patches, the restored dataset, or their combinations. In some embodiments, the refined neural network may use coarser initial step(s) followed by steps with finer-resolution. Afterwards, the boundary patches are combined for a finer restoration of the medical imaging dataset with finer segmentation. One or more method steps during the refinement process can be repeated until satisfactory results are obtained, e.g., a stopping criterion is met, a cost function is optimized, passed human visual examination, etc. Based on the segmentation, the user or the method herein can optionally adjust imaging intensity of one or more edges, one or regions, or both of the segmented vertebral bone to boost differentiation between the anatomical information of interest, e.g., vertebrae over surrounding tissues.

Figure 6C:
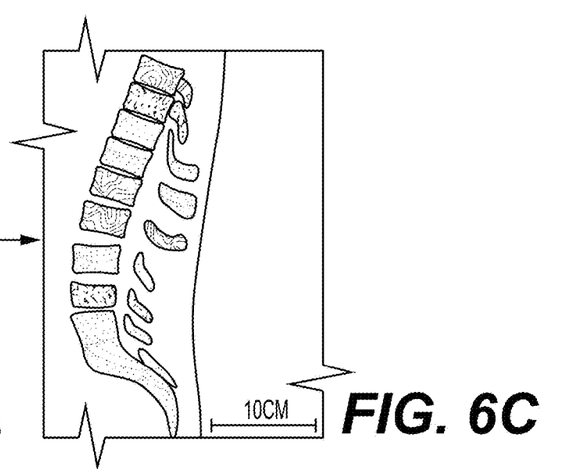
Figure 6D:
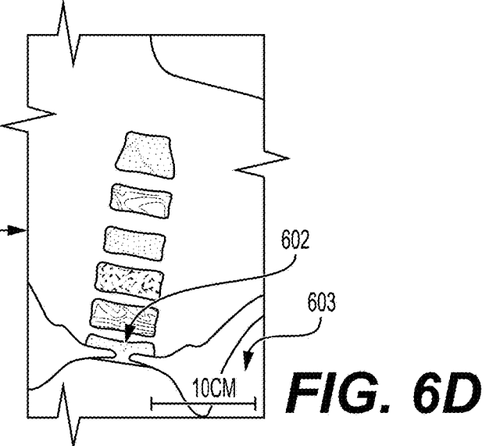
Figures 7A, 7B:
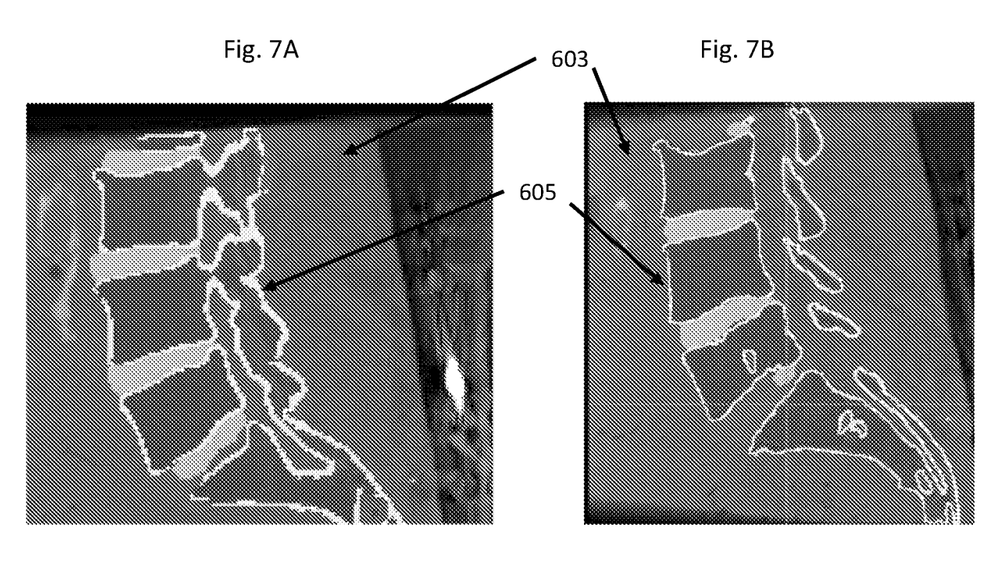
FIGS. 7A-7B show exemplary segmented CT images in a sagittal view; the images were segmented using deep learning algorithm(s).

In some embodiments, the methods using model-based algorithm(s) or deep learning based algorithm(s) herein takes a CT scan as its input 600, and output a segmentation mask 602 that can be superimposed on the input data, e.g., CT data, in arbitrary 3D planes, such as sagittal view, as shown in FIG. 6C, and/or coronal view (FIG. 6D). The input combined with the mask can be output data 603. Each vertebra may include a unique label, and they can be visualized with different color codes or grey scales (FIGS. 6C-6D). Alternatively, all the vertebrae can include a same label. For bone boosting, the methods herein may take a CT scan as its input 600 along with a segmentation mask 602. Such segmentation mask can be binary (e.g., vertebral bone or non-vertebral bone). The output of bone boosting can be a boosted 3D dataset 603 with voxels related to the contour 605 of the vertebrae modified, or the original CT scan with a segmented and boosted mask that enhances edges and/or portion(s) of the vertebrae of interest. Exemplary segmented vertebral bone and boosted vertebral bone edges are shown in FIGS. 7A-7B.

In some embodiments, segmenting one or more of the plurality of vertebral bones using the systems and methods herein may generate a label on each voxel in 3D scan. The label can be a Boolean label that indicates "bone" or "not bone". The label may indicate a voxel that is either "disc" or "not disc." The label may indicate a voxel that can be "spinal canal" or "other tissues."

In some embodiments, segmenting one or more of the plurality of vertebral bones using the systems and methods herein may generate an integer label on each voxel in 3D scan. Each vertebral level (e.g., L1, L2, etc.) can gets its own unique label, and all voxels inside that vertebra has the same label. Discs and spinal canal can get yet their own label value(s). In some embodiments, segmenting one or more of the plurality of vertebral bones using the systems and methods herein may generate anatomical sub-categories of each vertebral level. Such sub-categories can be assigned their own distinct label (e.g. 1=pedicle, 2=vertebral body, 3=spinous process, etc.). In some embodiments, part or the entirety of the entire 3D volume of the spine can be labeled. For example, all voxels in the interior of the vertebral level are all labeled with that level's label. In addition, those voxels that are on the bone surface (and so are adjacent to a non-bone voxel) can be identified. This subset of voxels can be used in bone boost or enhancement, for example, to enhance the bone borders in the images.

Although certain embodiments and examples are provided in the foregoing description, the inventive subject matter extends beyond the specifically disclosed embodiments to other alternative embodiments and/or uses, and to modifications and equivalents thereof. Thus, the scope of the claims appended hereto is not limited by any of the particular embodiments described herein. For example, in any method disclosed herein, the operations may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the systems, and/or devices described herein may be embodied as integrated components or as separate components.

What is claimed is:

1. A method comprising:
receiving a three-dimensional medical imaging dataset that includes a plurality of vertebral bones of a subject; and
segmenting the plurality of vertebral bones, wherein the segmenting includes:
obtaining a plurality of axial images from the three-dimensional medical imaging dataset;
extracting a spinal canal of the subject using a plurality of axial images from the three-dimensional medical imaging dataset;
after the extracting, generating an anterior line of the plurality of vertebral bones using one or more sagittal images from the medical imaging dataset;
after the extracting, obtaining a posterior line based on the extracted spinal canal; and generating a vertebral centerline using the anterior line and the posterior line;
wherein detecting one or more intervertebral discs; and determining a separating plane between adjacent vertebral bones from the detected intervertebral discs;
comprising: finding a bound box for each of the vertebral bones;
further comprising: segmenting intervertebral discs using a neural network; and
generating separating planes from the segmented intervertebral discs.

2. The method of claim 1, wherein extracting the spinal canal includes:
identifying the spinal canal using an outer contour of the spinal canal.

3. The method of claim 1, wherein extracting the spinal canal includes:
stacking the plurality of axial images; and
finding a path through the plurality of the axial images; and
using the path for canal segmentation.

4. The method of claim 1, further comprising:
using the segmented plurality of vertebral bones to generate integer labels for voxels of the three-dimensional medical imaging dataset.

5. The method of claim 1, wherein the medical imaging dataset is generated from a CT scanner.

* * * * *